(No Model.)  2 Sheets—Sheet 1.

G. D. BURTON.
FARE REGISTER.

No. 284,375.  Patented Sept. 4, 1883.

WITNESSES
Fred A. Pruell,
John F. C. Rinkert

INVENTOR
Geo. D. Burton (No Model.)　　　　　　　G. D. BURTON.　　　　2 Sheets—Sheet 2.
FARE REGISTER.

No. 284,375.　　　　　　　Patented Sept. 4, 1883.

UNITED STATES PATENT OFFICE.

GEORGE D. BURTON, OF NEW IPSWICH, NEW HAMPSHIRE.

FARE-REGISTER.

SPECIFICATION forming part of Letters Patent No. 284,375, dated September 4, 1883.

Application filed April 23, 1883. (No model.)

*To all whom it may concern:*

Be it known that I, GEORGE D. BURTON, of New Ipswich, county of Hillsborough, State of New Hampshire, have invented an Improvement in Fare-Registers, of which the following description, in connection with the accompanying drawings, is a specification, like letters on the drawings representing like parts.

My invention relates to a register for recording fares taken by conductors of street-railway cars, and for other analogous purposes, it being provided with two independent registering devices, to enable different kinds of fares—such, for instance, as whole and half fares—to be registered separately. The operating parts are contained in a case adapted to be carried upon the person of the conductor, and provided with a dial visible to the passengers in a car. The registering mechanism consists of wheel-work operating pointers, that indicate, in connection with the said dial, the number of fares, the said wheel-work including ratchets, which are rotated for the space of one tooth, to move the pointer for the space of one division, by means of pawls actuated by suitable knobs or handles outside of the case, and operated by the conductor when each fare is taken. The actuating-pawl of each registering device is connected with one arm of a lever, the other arm of which is connected with a stem passing through the case, and provided with a knob at the outside thereof, and the said stem also has connected with it a dog which operates a bell-hammer. The inclosing-case has a cover, which will usually be fastened and sealed, so that the mechanism cannot be tampered with without discovery.

Figure 1:
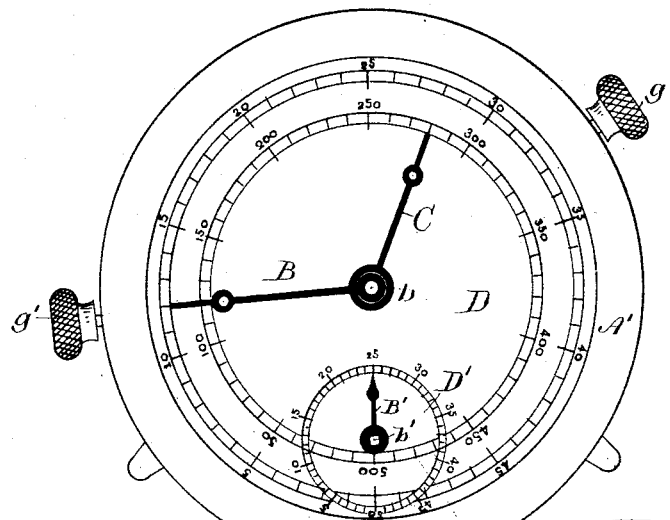
Figure 5:
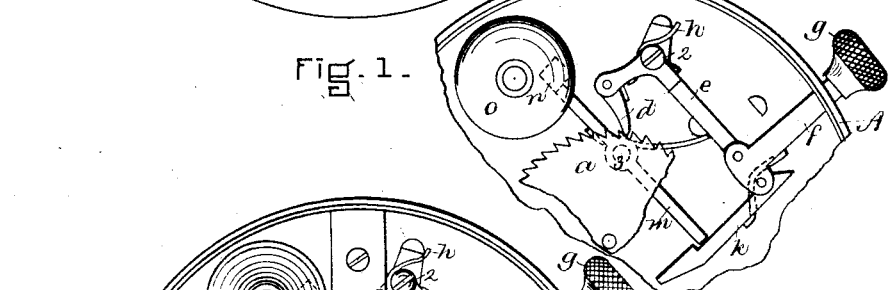
Figure 2:
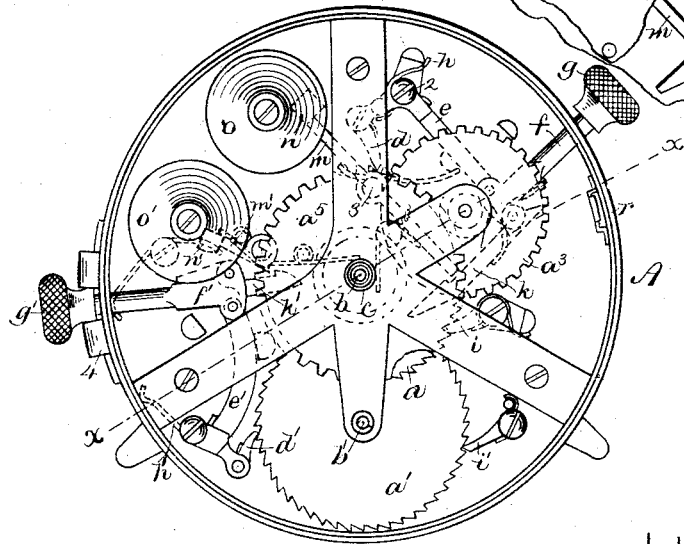
Figure 3:
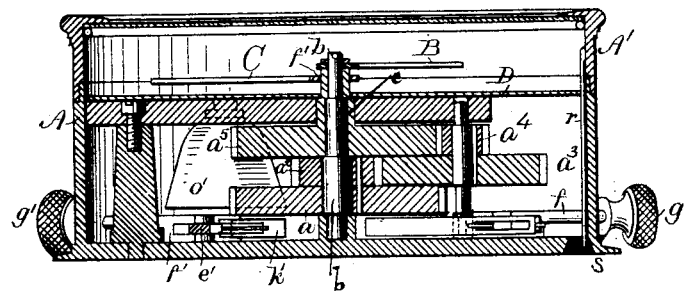
Figure 4:
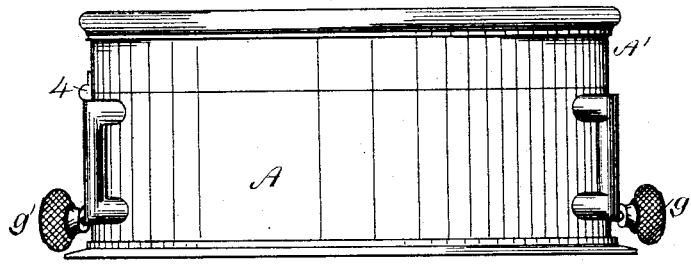

Figure 1 is a face view of the fare-registering apparatus embodying this invention; Fig. 2, a similar view, with the dial and pointers removed to show the parts within; Fig. 3, a transverse section on line *x x*, Fig. 2; Fig. 4, an elevation, and Fig. 5 a detail, of a part of the apparatus shown in dotted lines, Fig. 2.

The main train of wheel-work consists of a ratchet-wheel, $a$, fixed upon an arbor, $b$, at the middle of the case A, the said arbor carrying the pointer B, co-operating with the outer ring of graduations on the dial D, (shown in Fig. 1,) the said wheel $a$ having the same number of teeth that the ring has graduations. The wheel $a$ has connected with it a pinion, $a^2$, which meshes with an intermediate gear, $a^3$, having a pinion, $a^4$, meshing with the gear $a^5$, and this last gear has a sleeve, $c$, placed and turning loosely upon the arbor $b$, and carrying a pointer, C, co-operating with the inner circle of graduations, the train of gearing $a\ a^2\ a^3\ a^4\ a^5$ being such that the pointer C makes one revolution while the pointer B is making ten revolutions. The ratchet $a$ and connected train of gearing and pointers B C are actuated by a pawl, $d$, carried by one arm of a lever, $e$, pivoted at 2, and having its other arm connected with the rod $f$, passing out through the case A, and provided with a knob, $g$, by which it may be moved outward from the said case, causing the pawl $d$ to engage one of the teeth of the wheel $a$ and turn the said wheel for the space of one tooth. When the knob $g$ is released by the operator, it is returned to its normal position by the spring $h$ acting on the lever $e$, thus moving the pawl $d$ backward over the periphery of the wheel $a$ to engage the next tooth thereof, the said wheel being prevented from turning backward by a retaining-pawl, $i$. The stem $f$ also has connected with it a spring trip-lever or dog, $k$, engaging a lever, $m$, pivoted at 3, and provided with a bell-hammer, $n$, which, when the said lever $m$ escapes from the dog $k$ in the movement of the latter, strikes the bell $o$, and thus produces a sound at the same time that the pointer B is moved forward for one space on the dial.

It will be seen that with the wheels proportioned as shown the pointers B and C will register five hundred separate operations of the knob $g$, which will usually be as great a number as is desirable to be registered at one time or during one day. The registering device for indicating the number of fares of another character—such as half-fares—consists of a ratchet-wheel, $a'$, mounted on an arbor, $b'$, provided with a pointer, B', co-operating with the small circle D' of graduations on the dial, there being in this case no train of wheel-work, as there is usually a much smaller number of half-fares than of whole fares to be recorded in a given time. The wheel $a'$ is actuated by a pawl, $d'$, carried by a lever, $e'$, connected with a stem, $f'$, extended out through the case A, and provided with a knob, $g'$, and also having a dog, $k'$, operating the lever $m'$, provided with a bell-hammer, $n'$, for striking the bell $o'$, the said parts being all constructed and operating substantially the same as the parts previously described for actuating the wheel $a$ and striking the bell $o$. The lever $i'$ is moved back to its normal position, after being operated by the knob $g'$, by a spring, $h'$, and the wheel $a'$ is prevented from turning backward by a retaining-pawl, $i$.

The cover $A'$ of the case A is hinged at 4, and provided with a stem or rod, $r$, passing through to the back of the case A, where it enters a socket, $s$, in which it is fastened by sealing-wax or equivalent material, impressed with a suitable seal, so that the said fastening cannot be detached and the case opened without detection. The case is opened from time to time—as, for instance, at the end of each day—by an authorized person, who will make a record of the figures indicated by the register, and may set the pointers thereof to the zero-point.

I claim—

An organization for registering fares of different kinds, consisting of the dials, pointers, and arbors, the ratchet-wheels $a$ $a'$, train of gearing $a^2$, $a^3$, $a^4$, and $a^5$, knobbed rods $f$ $f'$, with their respective levers $e$ and $e'$, pawls $d$ and $d'$, trip-levers $k$ and $k'$, springs $h$ and $h'$, pivoted hammer-levers $m$ and $m'$, hammers $n$ and $n'$, and bells $o$ and $o'$, and the inclosing-case A, all constructed and arranged to operate substantially as shown and described.

In testimony whereof I have signed my name to this specification in the presence of two subscribing witnesses.

GEO. D. BURTON.

Witnesses:
 J. M. BURTON,
 E. F. PERKINS.